May 11, 1954

B. BREUNESSE 2,677,934

APPARATUS FOR RENDERING AND KEEPING
PORTS, HARBORS, RIVER-MOUTHS
AND THE LIKE SILT-FREE

Filed April 28, 1952

INVENTOR.
Bart Breunesse
BY
Thenderoth, Lind & Ponack
Attorneys.

Patented May 11, 1954

2,677,934

UNITED STATES PATENT OFFICE 2,677,934

APPARATUS FOR RENDERING AND KEEPING PORTS, HARBORS, RIVER MOUTHS, AND THE LIKE SILT FREE

Bart Breunesse, The Hague, Netherlands

Application April 28, 1952, Serial No. 284,796

Claims priority, application Netherlands April 28, 1951

4 Claims. (Cl. 61—3)

The silting up of ports, harbours and river-mouths is mostly due to various factors.

The most important factors are that in the lower courses especially of rivers there will be an upper current of fresh water and an under current of salt water. Thus a zone will form between the two currents, in which zone a flocculation will take place, which is a result of the fact that the colloidal particles suspended in the currents will have opposite electric charges, will attract one another owing to which they will form larger complexes and will precipitate.

Moreover the salt under-current has a very important share in the silting up.

Furthermore the silting up of ports, harbours and rivers will also be promoted by the influence of eddying currents in the mouth of the port, harbour or river.

From the above it appears therefore that the above causes should be eliminated as much as possible.

It is known to provide dikes or the like in the mouth of ports, harbours and rivers for said purpose, the height of which dikes is only part of the water level. This solution, however, is not effective, because the heavier salt water will accumulate before the dike until it runs over the dike, if at least the salt water, owing to its being stirred up, has not yet earlier entered the port, harbour or river across the dike. In due course the salt water will again leave the harbour, port or river mouth the silt remaining behind.

The object of the present invention is to eliminate this drawback by providing a screen extending from the bed to at least the surface of the water, which screen is adapted to be lowered in order that ships may enter the port, harbour or river.

In point of fact therefore the screen temporarily closes the entire mouth of the port, harbour or river mouth.

However, it is also possible that in the port, harbour or river, a current flowing towards the sea and directed along the bottom of the port, harbour or river will be created, which current discharges much silt-containing water.

In connection therewith passages are preferably provided either below the screen or in the lower portion thereof, which passages may either be adapted to be obturated or not. If owing to the ebb the water outside the screen falls, a current will be produced whereby specially the salt water and at the same time the silt is removed. If the water at the outside of the screen rises, the passages may be obturated.

The screen itself can have its upperside secured to at least one float, which float can be filled with water by pumping, so as to lower the screen.

The invention will now be elucidated in greater detail with reference to the accompanying drawing showing some embodiments, while at the same time some further features of the apparatus according to the invention will be discussed.

In the drawing:

Fig. 1 diagrammatically shows a screen comprising two parts;

Figure 1:
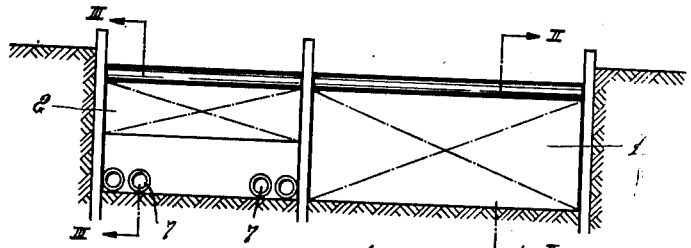
Figure 2:
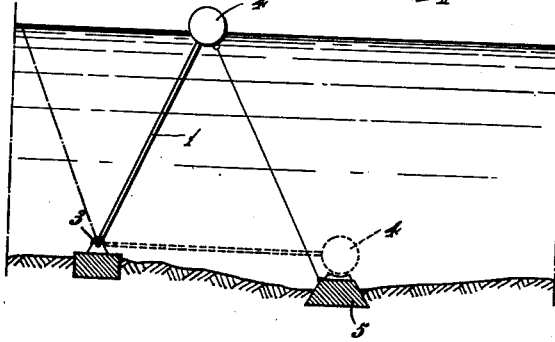
Fig. 2 shows a section on the lines II—II in Fig. 1.
Figure 3:
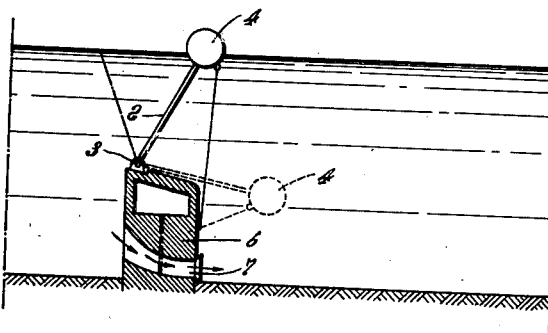
Fig. 3 shows a section on the line III—III in Fig. 1.

In the embodiment shown in Figs. 1-3 the screen comprises two parts 1 and 2.

The part 1 extends down to the bottom of the port, harbour or river mouth and is pivotable about a shaft 3 there. In this case the screen is made of a rigid material, but it may also be made of a flexible material.

To the upper side of the screen a float 4 is secured, which float can be pumped full of water, so that the screen will sink and the float will come to rest on a foot 5. By means of cables the screen can be secured from movements that might be caused by passing ships.

The part 2 is pivoted to a fixed construction 6, in which construction passages 7 are provided, through which the undercurrent of water may be discharged from the harbour, port or river. These passages may be adapted to be obturated.

Figure 4:
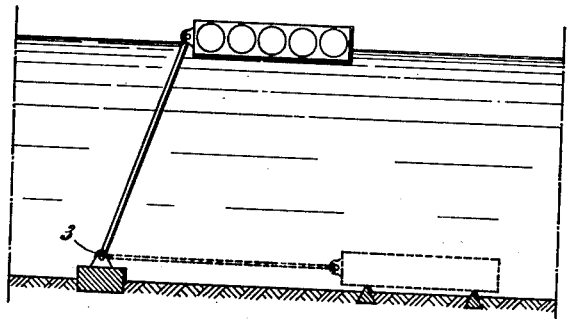
Fig. 4 shows another embodiment of the screen.

In the embodiment shown in Fig. 4 the float is constructed as a floating bridge.

The apparatus as disclosed hereinabove and as shown in the figures of the drawing thus effectively comprises a screen which extends over the entire width of the basin and to the bottom of the basin, the screen adapted to be lowered or raised as conditions may require, such as, for example, when ships enter port or the river or when the salt water which is heavier is to be cut off as is necessary, and wherein the screen is rigid and has its lower edge pivoted to the foundation and its upper edge maintained at least as high as the surface of the water by means of floats provided for this purpose. As shown in Fig. 3, non-return valves or construction passages 7 may be provided to facilitate the discharge on either side of the screen. Further, the screen may be subdivided into juxtaposed portions of various heights such as indicated in Fig. 3.

It will be clear that without departing from the scope of the invention other embodiments are possible, thus for example a screen may be used consisting of one part which is secured either directly or via a fixed construction to the bed of the port, harbour or river.

I claim:

1. An apparatus for closing a harbor basin or the like and for preventing the building up of silt therein comprising a rigid screen which extends over the entire width of said basin and to the bottom thereof, a foundation for said screen, said screen pivoted at its lower edge to said foundation, said screen so constructed and arranged so that its upper edge is adapted to be maintained at least as high as the surface of the water in the basin and floats to maintain the upper edge of said screen at the surface of the water.

2. An apparatus as in claim 1 wherein the lower portion of the screen is provided with passageways and non-return valves for the discharge of water on either side of the screen.

3. An apparatus as in claim 1 wherein the screen is sub-divided into juxtaposed portions of various heights.

4. An apparatus as in claim 2 wherein the screen is sub-divided into juxtaposed portions of various heights.

References Cited in the file of this patent

UNITED STATES PATENTS

| Number | Name | Date |
| --- | --- | --- |
| 1,797,661 | Huguenin | Mar. 24, 1931 |

FOREIGN PATENTS

| Number | Country | Date |
| --- | --- | --- |
| 299,050 | Germany | of 1920 |
| 377,004 | Germany | of 1923 |
| 607,468 | France | of 1926 |